M. LEITCH.
MILKING MACHINE.
APPLICATION FILED FEB. 16, 1915.

1,195,995.

Patented Aug. 29, 1916.
2 SHEETS—SHEET 1.

WITNESSES:
Rob't R. Kitchel.
E. E. Wall

INVENTOR
Meredith Leitch
BY
Frank S. Busser
ATTORNEY.

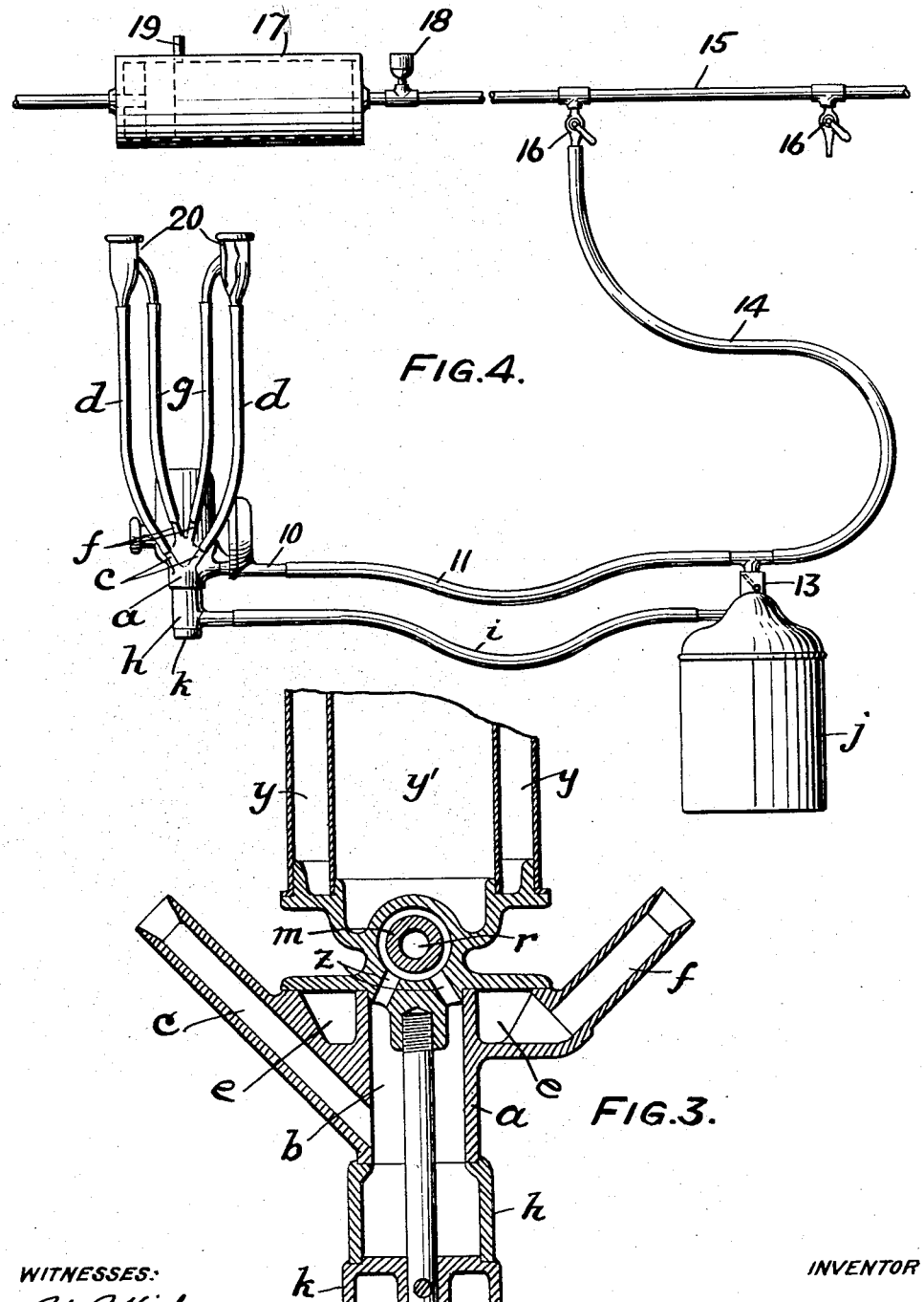

UNITED STATES PATENT OFFICE.

MEREDITH LEITCH, OF POUGHKEEPSIE, NEW YORK, ASSIGNOR TO THE DE LAVAL SEPARATOR COMPANY, A CORPORATION OF NEW JERSEY.

MILKING-MACHINE.

1,195,995.  Specification of Letters Patent.  Patented Aug. 29, 1916.

Application filed February 16, 1915. Serial No. 8,456.

*To all whom it may concern:*

Be it known that I, MEREDITH LEITCH, a citizen of the United States, residing at Poughkeepsie, county of Dutchess, and State of New York, have invented a new and useful Improvement in Milking-Machines, of which the following is a full, clear, and exact description, reference being had to the accompanying drawings, which form a part of this specification.

My invention relates to cow milking machines of the type having two chambered teat cups. Previously used machines of this type may be divided into two classes. The first and larger class has an individual air-driven engine to operate the valves for each machine. This makes the machines complicated, expensive and liable to get out of order. The second class has a master pulsator that supplies pneumatic, electric or other impulses to operate the milking machine valve. These, in addition to the master pulsator, require separate pipes or wires to convey the master pulsations and so add to the complication and cost. Both require a vacuum pump and in some cases an air compressing pump also.

One object of my invention is to provide a milking machine with which one pump cylinder or its equivalent serves as both exhauster and master pulsator and wherein one pipe line serves to convey master pulsations and at the same time carry air from the machines.

Some machines using double chambered teat cups exhaust the air from the outer or teat compressing chamber into the milk passages to cause momentary reductions in the vacuum acting on the teats. Because the above mentioned chambers are difficult to clean or inspect, the air from them tends to be foul and cause a great bacterial contamination of the milk.

A second object of my invention is to dispose of the foul air without contact with the milk and to provide clean air to break the vacuum in the teat cups.

Figure 2:
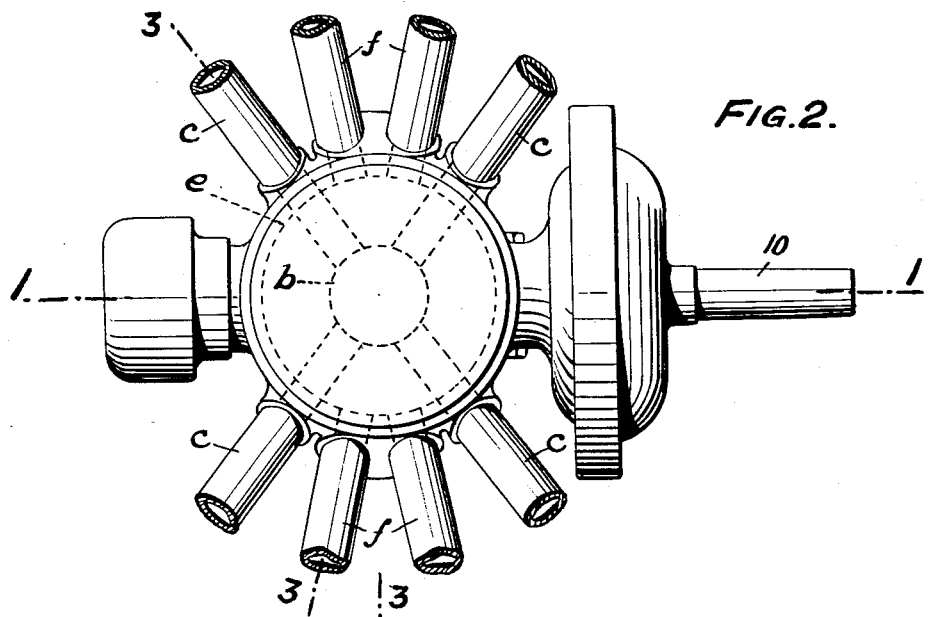
Figure 1:
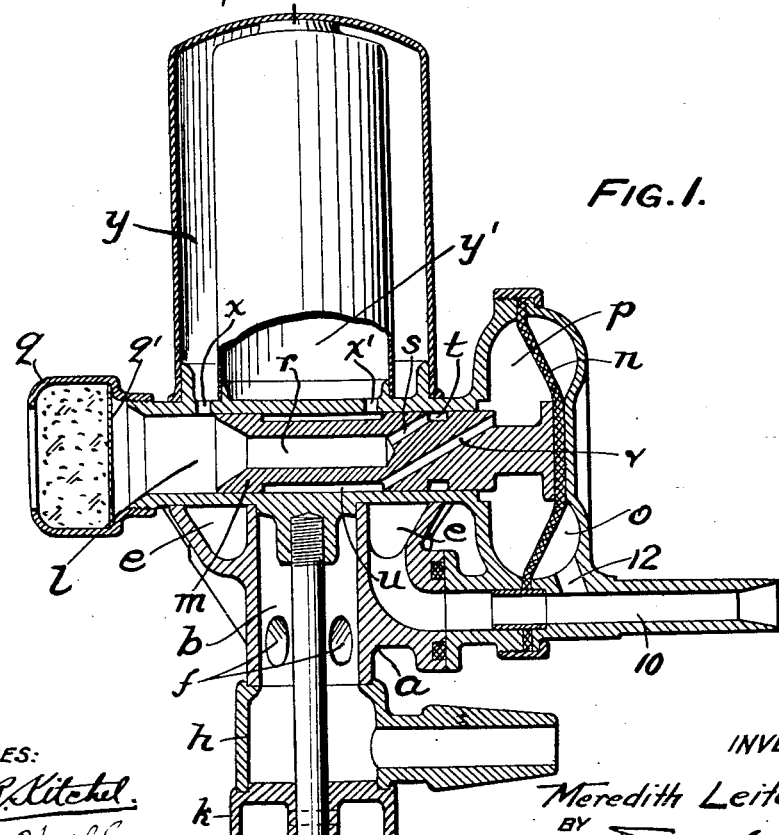

In the accompanying drawings, which show a preferred embodiment of my invention: Figure 1 is a vertical sectional view of the pulsator on the line 1—1 of Fig. 2. Fig. 2 is a plan view. Fig. 3 is a vertical section on the line 3—3 of Figs. 1 and 2. Fig. 4 is a diagrammatic view of a complete installation.

A claw $a$ has a central chamber $b$ from which project four tubes $c$ adapted to connect to flexible extensions $d$ of the inner or teat receiving chambers of the teat cups 20. The claw $a$ has also an annular chamber $e$ from which project four tubes $f$ adapted to be flexibly connected with the outer chambers of the teat cups. A T-shaped tube $h$ fits against the bottom of the claw and provides communication between it and the flexible pipe $i$ leading to the milk pail $j$. The lower end of the T is closed by the head of a bolt $k$, which holds the T and claw against the bottom of the pulsator proper. The pulsator has an enlarged bottom that forms the top of the central chamber $b$ and of the annular chamber $e$. The pulsator has a cylinder $l$ in which reciprocates a piston valve $m$. One end of the cylinder $l$ is enlarged to form a space separated by the diaphragm $n$ into two chambers $o$ and $p$. At the other end of the cylinder, and separated from it by a perforated plate $q'$, is a cup $q$ filled with cotton performing the function of an air filter. The piston $m$ has a central chamber $r$ communicating by holes $s$ with an annular groove $t$, and an annular groove $u$ communicating by a hole $v$ with the diaphragm chamber $p$. From the cylinder $l$ ports $x$ and $x'$ open into air chambers $y$ and $y'$ and ports $z$ open into the central chamber $b$.

From the annular chamber $e$ in the claw $a$ passage 10 leads to the flexible tube 11 connecting on to the vacuum pipe 14 from the milk pail to the vacuum line. A branch 12 from the passage 10 opens into the diaphragm chamber $o$. At 13 is a check valve allowing air to pass from the pail $j$ to the vacuum pipe 14 but preventing its return. A pipe line 15 has cocks 16 and pipe connections at each stanchion. A pump 17 is connected to the pipe line 15 and has an air discharge valve 18.

If it is desired to have the compression of the teats quick and snappy, a port 19 is placed in the pump cylinder so located that as the piston nears the end of its suction stroke, the port will be uncovered and allow a sudden rush of air at atmospheric pressure into the system. If a slow application of pressure is desired this port is omitted and the compression takes place gradually as the pump piston moves on its compression stroke.

It will be understood that the pump, during its suction stroke draws air from the pipes 15, 14 and 11 and the pail $j$. During the return or compression stroke of the pump, the pressure in the pipe system rises above atmospheric pressure and air discharges through the valve 18, the valve 13 closing, and preventing return of air to the pail $j$. It may be stated that after a few strokes of the pump the vacuum in the pail will approximate the maximum obtainable with the pump.

The annular chamber $e$ being in direct and constant communication, through pipes $f$ and $g$, with the outer chambers of the teat cups, and through pipe 10, with the pipe system 11, 14 and 15, it will be understood that the pipe line pulsations are communicated directly to the outer chambers of the teat cups and cause intermittent compression of the teats.

The chamber $b$, being in direct and constant communication through the pipe $i$, with the pail $j$, is always under suction. The inner chambers of the teat cups, being in direct and constant communication, through pipes $c$ and $d$, with the chamber $b$, are also always under suction. So, also, is the diaphragm chamber $p$, which is in direct and constant communication, through hole $v$, annular groove $u$ and ports $z$, with the chamber $b$.

During the suction stroke of the pump, the diaphragm chamber $o$, as well as the diaphragm chamber $p$, is under suction. Hence the diaphragm is free, and atmospheric pressure acting on the piston $m$ forces it to the right—the position shown in Fig. 1. When the piston reaches this position the port $x$ is uncovered, and air that has passed through the cotton filter in cup $q$ enters and fills the reservoir $y$, while air previously stored in the reservoir $y'$ passes, through the port $x'$, the annular space $u$ and the ports $z$, into the chamber $b$, causing a momentary break or reduction in the vacuum in said chamber and in the connected inner chambers of the teat cups. By choosing a proper size of air chamber, any desired break in vacuum may be obtained.

During the compression stroke of the pump the pressure in the diaphragm chamber $o$ rises to atmospheric and because of the vacuum in the chamber $p$ forces the diaphragm against the piston $m$ and moves it to the other end of its stroke. The annular groove $t$ now registers with the port $x'$ and filtered air enters through the passage $r$, the holes $s$, the annular groove $t$ and the port $x'$ to fill the reservoir $y'$. At the same time air previously stored in the reservoir $y$ escapes through the port $x$, the annular space $u$ and the ports $z$ and breaks or reduces the vacuum in the chamber $b$ and the connected teat cups.

It will be noted that in each cycle the teats are compressed once and the vacuum is reduced twice. Evidently if it is desired to break the vacuum only once per cycle, only one reservoir and corresponding ports in the valve $m$ will be provided. Such a construction is set forth in an application filed of even date herewith, Serial No. 8457.

It will be understood that it is because of the obstruction of the pipe $i$ by milk that the admission of a small quantity of air to the chamber $b$ causes a decided reduction in the vacuum in this chamber and the connected teat cups. When the milk flows freely, the obstruction of milk in the pipe $i$ is such as to create a pulsation of considerable amplitude and a suction of minor intensity, whereas when the milk flow is scanty and the obstruction of milk in the pipe $i$ is materially lessened, the amplitude of the pulsations is substantially reduced and the intensity of the suction correspondingly increased. The mode of operation, in this respect, is therefore the same as in the Hulbert Patents No. 1,043,013 and No. 1,070,134. So also, as in the Hulbert patents, the above result is effected by intermittently admitting air to a milk discharge which is constantly under and in communication with a source of suction. So also, as in the Hulbert patents, pressure is admitted into the milk discharge alternately with the compression of the teat, although it is preferred, as disclosed herein, to also admit pressure to the milk discharge simultaneously with the compression of the teat, thus producing a double vacuum break per cycle.

It will be observed that the construction is such that the pump 17 performs the function of both an exhauster and a master pulsator and that a single pipe line serves to convey master pulsations and at the same time carry air from the machines.

The construction forms the subject matter of a patent issued to me Dec. 7, 1915, No. 1,163,161 on an application filed by me of even date herewith, upon which the invention herein set forth is an improvement.

Having now fully described my invention, what I claim and desire to protect by Letters Patent is:

1. In a milking machine, a teat cup and a milk discharge therefrom, means to establish continuous suction therein and means to admit a measured volume of clean air to momentarily reduce the vacuum in the teat cup and milk discharge.

2. In a milking machine, in combination, a double chambered teat cup, a milk discharge from the inner chamber of the teat cup constantly under suction, and means, including an air inlet to the milk discharge closed against admission of air from the outer chamber of the teat cup, tending to produce pulsations in said discharge varying in amplitude directly as the flow of the milk and to vary the suction therein inversely as the flow of the milk.

3. In a milking machine, in combination, a double chambered teat cup, a milk discharge from the inner chamber of the teat cup constantly under suction, and means exterior to the teat cup, and including an air inlet to the milk discharge closed against admission of air from the outer chamber of the teat cup, tending to vary the suction in said discharge inversely as the flow of the milk.

4. In a milking machine, in combination, a double chambered teat cup, a milk discharge from the inner chamber of the teat cup constantly under suction, and means including an air inlet to the milk discharge closed against admission of air from the outer chamber of the teat cup, tending to produce pulsations in said discharge varying in amplitude directly as the flow of the milk.

5. In a milking machine, in combination, a double chambered teat cup, a milk discharge from the inner chamber of the teat cup, non-intercommunicating passages communicating respectively with the milk discharge and with the outer teat cup chamber, means to intermittently admit air into each passage, and means to create a continuous suction in the milk passage and to intermittently rarefy the air in the passage to the outer teat cup chamber.

6. In a milking machine, a double chambered teat cup, a milk pail, a milk discharge passage between the milk pail and the inner chamber of the teat cup, a passage connected to the outer teat cup chamber, means independent of the milk pail to rarefy the air in the last named passage, and non-intercommunicating ports, connecting with the respective passages, adapted to effect the intermittent admission of air thereto.

7. In a milking machine, in combination, a double chambered teat cup, a milk discharge from the inner chamber of the teat cup constantly under suction, and means to vary the fluid pressure in both chambers of the teat cup, said means including a valve adapted in its movement to intermittently connect the milk discharge with a source of air supply independent of the outer chamber of the teat cup.

8. In a milking machine, in combination, a double chambered teat cup, a milk discharge from the inner chamber of the teat cup constantly under suction, a pipe leading to the outer chamber of the teat cup and through which pressure fluid is admitted to and exhausted from the outer chamber of the teat cup, and an inlet through which fluid pressure is intermittently admitted to the milk discharge, said inlet being closed against admission of air from said pipe.

9. In a milking machine, in combination, a double chambered teat cup, a milk discharge from the inner chamber thereof constantly under suction, a pipe to the outer chamber of the teat cup, means to produce pneumatic pulsations therein, and a pressure supply port closed from communication with said pipe and through which pressure fluid is intermittently admitted to the milk discharge.

10. In a milking machine, in combination, a teat cup, a milk discharge therefrom, an air reservoir independent of the teat cup, a source of fluid supply, and a valve adapted to connect the reservoir alternately with the source of fluid supply and with the milk discharge.

11. In a milking machine, in combination, a double chambered teat cup, a claw having a pulsation chamber connectible to the outer chamber of the cup and an independent milk receiving chamber connectible with the inner chamber of the cup, means to place the milk receiving chamber constantly under suction, and means, including an inlet closed against admission of pressure fluid from the pulsation chamber and outer teat cup chamber, to intermittently admit pressure fluid into the milk discharge.

12. In a milking machine, a double chambered teat cup, a claw having a pulsation chamber connectible to the outer chamber of the cup and an independent milk receiving chamber connectible to the inner chamber of the cup, a pipe, means to intermittently rarefy the air therein, connections including a check valve between said pipe and the milk receiving chamber, and an air valve adapted to intermittently connect said milk receiving chamber with a source of pressure fluid, said pipe connecting with said valve to control the operation of the same and with said pulsation chamber to intermittently exhaust air therefrom.

13. In a milking machine, in combination, a double chambered teat cup, a milk pail, a claw having a pulsation chamber connectible with the outer chamber of the cup and an independent milk receiving chamber connectible with the inner chamber of the cup and with the milk pail, a pipe, means to intermittently rarefy the air therein, a check valve connection between said pipe and the milk pail, an air reservoir, and an air valve adapted to connect said reservoir alternately with the atmosphere and with the milk receiving chamber in the claw, said pipe connecting with said valve to control the operation of the same and with said pulsation chamber to intermittently exhaust air therefrom.

14. In a milking machine, in combination, a set of double chambered teat cups, common pulsation means to exhaust air from the pail and the inner chambers of said teat cups and to produce pneumatic pulsations in the outer chambers of said teat cups so as to intermittently compress the teats, and separate means controlled by the first means to produce intermittent reductions in the vacuum in the inner chambers of said teat cups.

15. In a milking machine, in combination, a set of double chambered teat cups, a milk pail, common pulsation means to exhaust air from the pail and from the inner chambers of said teat cups and to produce pneumatic pulsations in the outer chambers of said teat cups so as to intermittently compress the teats, and means to intermittently admit measured volumes of air to break the vacuum in the inner chambers of said teat cups so arranged that no foul air from the outer teat cup chambers can come in contact with the milk.

16. In a milking machine, in combination, a double chambered teat cup, a milk discharge therefrom, a pipe connected to the outer chamber of the teat cup, means to produce pneumatic pulsations therein, a source of air supply, a reservoir, and a valve adapted to establish connections between the air supply and the reservoir and between the reservoir and the milk discharge.

17. In a milking machine, in combination, a double chambered teat cup, a master pulsator adapted to exhaust pressure fluid from the inner chamber of the teat cup and produce pneumatic pulsations in the outer chamber of the teat cup to intermittently compress the teat, and other means to produce intermittent reductions in the partial vacuum in the inner chamber of the teat cup.

18. In a milking machine, in combination, a double chambered teat cup, means including a single pulsation pipe line to exhaust fluid from the inner chamber of the teat cup and to produce pulsations in the outer chamber of the teat cup to intermittently compress the teat, and means to intermittently admit pressure fluid to the inner chamber of the teat cup from a source independent of the outer teat cup chamber.

19. In a milking machine, in combination, a set of double chambered teat cups, a claw having a pulsation chamber connectible to the pulsation chambers of said cups and a milk receiving chamber connectible to the teat chambers of said teat cups, a milk pail in communication with the milk receiving chamber, an air reservoir, an air valve adapted in its movement to connect said reservoir alternately with the atmosphere and with said milk receiving chamber in the claw, and common pulsating means to exhaust air from said milk pail, to move said air valve and to produce pneumatic pulsations in the pulsation chamber of the claw.

20. In a milking machine, in combination, a double chambered teat cup, a milk discharge from the inner chamber of the teat cup, a valve adapted to intermittently admit pressure fluid to the milk discharge, a pipe connected with said valve, means to alternately increase and decrease the pressure in said pipe and thereby control the operation of said valve, a check valve connection between the pipe and the milk discharge, and a passage permanently open between the outer chamber of the teat cup and said pipe.

21. In a milking machine, in combination, a double chambered teat cup, a milk discharge from the inner chamber of the teat cup, a valve adapted to intermittently connect the milk discharge with a source of clean air supply, and common pulsating means to exhaust air from the milk discharge, to control the operation of said valve, and to produce pneumatic pulsations in the outer chamber of said teat cup to intermittently compress the teat.

22. In a milking machine, in combination, a double chambered teat cup, a milk discharge from the inner chamber of the teat cup, an air reservoir, a valve adapted in its movement to connect said reservoir alternately with the atmosphere and with the milk discharge, and common pulsating means to exhaust air from the milk discharge, to control the operation of said valve, and to produce pneumatic pulsations in the outer chamber of the teat cup.

23. In a milking machine, in combination, a double chambered teat cup, a claw having a pulsation chamber connectible to the outer chamber of the teat cup and an independent milk receiving chamber connectible with the inner chamber of the cup and adapted to be placed under suction, an independent air reservoir, an air valve adapted in its movement to connect the air reservoir alternately with the atmosphere and with the milk receiving chamber, and means to operate said valve and to produce pneumatic pulsations in the pulsation chamber of the claw.

24. In a milking machine, in combination, a double chambered teat cup, a claw having a pulsation chamber connectible to the outer chamber of the cup and an independent milk receiving chamber connectible to the inner chamber of the cup, a pipe, means to create pneumatic pulsations therein, connections including a check valve between said pipe and the milk receiving chamber, and a valve adapted to intermittently connect said milk receiving chamber with a source of pressure fluid, said pipe connecting with said valve to control the operation of the same and with said pulsation chamber to produce pulsations therein.

25. In a milking machine, in combination, a double chambered teat cup, a claw having a pulsation chamber connectible to the outer teat cup chamber and a milk receiving chamber connectible to the inner teat cup chamber, a valve chamber, a valve slidable in the valve chamber and adapted in its movement to intermittently admit pressure fluid to the milk receiving chamber, and common pulsating means to control the operation of the valve, produce pulsations in the pulsation chamber and to establish a continuous suction in the milk receiving chamber.

26. In a milking machine, in combination, a double chambered teat cup, a claw having a pulsation chamber connectible to the outer teat cup chamber, a milk receiving chamber connectible to the inner teat cup chamber and a valve chamber, a valve slidable in the valve chamber and adapted in its movement to intermittently admit pressure fluid to the milk receiving chamber, a pipe, and means to produce pneumatic pulsations therein, said pipe connecting with said milk-receiving chamber to create suction therein, with said valve to control its operation, and with said pulsation chamber to produce pulsations therein.

27. In a milking machine, in combination, a double chambered teat cup, a claw having a pulsation chamber connectible to the outer chamber of the cup, a milk receiving chamber connectible to the inner chamber of the cup, and a passage to the milk receiving chamber closed against admission of air from the pulsation chamber, a reservoir, a valve adapted in its movement to connect the reservoir alternately with the atmosphere and with said passage, and common pulsating means to control the operation of said valve, produce pulsations in the pulsation chamber and establish a continuous suction in the milk receiving chamber.

28. In a milking machine, in combination, a double chambered teat cup, a claw having a pulsation chamber connectible to the outer chamber of the cup, a milk receiving chamber connectible to the inner chamber of the cup, and a passage to the milk receiving chamber closed against admission of air from the pulsation chamber, a reservoir, a valve adapted in its movement to connect the reservoir alternately with the atmosphere and with said passage, a pipe, means to produce pneumatic pulsations therein, said pipe connecting with said milk receiving chamber to create suction therein, with said valve to control its operation and with said pulsation chamber to produce pulsations therein.

29. In a milking machine, in combination, a double chambered teat cup, a claw having a plusation chamber connectible to the outer teat cup chamber, a milk receiving chamber connectible to the inner teat cup chamber and a valve chamber, a valve slidable in the valve chamber and adapted in its movement to intermittently admit pressure fluid to the milk receiving chamber, one end of said valve chamber being enlarged, a diaphragm controlling the valve and dividing the enlarged end of the valve chamber into two compartments, a pipe, means to create pneumatic pulsations therein, said pipe constantly communicating with one of said compartments and with the pulsation chamber and connecting with the milk receiving chamber to establish suction therein.

30. In a milking machine, in combination, a double chambered teat cup, a milk discharge from the inner chamber of the teat cup, a valve chamber, a valve slidable therein adapted in its movement to intermittently admit pressure fluid to the milk discharge, one end of said valve chamber being enlarged, a diaphragm controlling the valve and dividing the enlarged end of the valve chamber into two compartments, a pipe, means to create pneumatic pulsations therein, said pipe constantly communicating with one of said compartments and with the outer chamber of the teat cup and connected with the milk discharge to create suction therein.

31. In a milking machine, in combination, a double chambered teat cup, a milk discharge from the inner chamber of the teat cup, a reservoir, a valve chamber, a valve slidable therein adapted in its movement to connect said reservoir alternately with the atmosphere and with the milk discharge, one end of said valve chamber being enlarged, a diaphragm controlling the valve and dividing the enlarged end of the valve chamber into two compartments, a pipe, means to create pneumatic pulsations therein, said pipe constantly communicating with one of said compartments and with the outer chamber of the teat cup and connected with the milk discharge to create suction therein.

32. In a milking machine, in combination, a double chambered teat cup, a claw having a pulsation chamber connectible to the outer chamber of the teat cup, a milk receiving chamber connectible to the inner chamber of the teat cup, and a valve chamber, a reservoir, a valve slidable in the valve chamber and adapted in its movement to connect the reservoir alternately with the atmosphere and with the milk receiving chamber, one end of the valve chamber being enlarged, a diaphragm controlling the valve and dividing the enlarged end of the valve chamber into two compartments, a pipe, means to create pneumatic pulsations therein, said pipe constantly communicating with one of said compartments and with the pulsation chamber and connecting with the milk receiving chamber to create suction therein.

33. In a milking machine, in combination, a double chambered teat cup, a claw having a pulsation chamber connectible to the outer chamber of the teat cup, a milk receiving chamber connectible to the inner chamber of the teat cup, and a valve chamber opening at one end to the atmosphere, a valve slidable therein having a central portion opening toward the open end of the valve chamber and having also a groove therein, the other end of the valve chamber being enlarged, a diaphragm controlling the valve and dividing the enlarged end of the valve chamber into two compartments, a port in said valve connecting said groove with one of the said compartments, a reservoir, ports in the valve chamber communicating respectively with the reservoir and with the milk receiving chamber, said valve in its movement connecting the first of the last named ports alternately with the open end of the valve chamber and with said groove, the other of the last named ports establishing communication between said groove and the milk receiving chamber, and means to create pulsations in the other of said compartments and in the outer chamber of the teat cup and establish suction in the milk receiving chamber.

34. In a milking machine, in combination, a double chambered teat cup, a claw having a pulsation chamber connectible to the outer chamber of the teat cup, a milk receiving chamber connectible to the inner chamber of the teat cup, and a valve chamber opening at one end to the atmosphere, a valve slidable therein having a central portion opening toward the open end of the valve chamber and having two grooves therein, the other end of the valve chamber being enlarged, a diaphragm controlling the valve and dividing the enlarged end of the valve chamber into two compartments, a port in said valve connecting one groove with one of said compartments, a port connecting the other groove with the open central portion of the valve, two reservoirs, three ports in the valve chamber communicating with the two reservoirs and with the milk receiving chamber, said valve in its movement adapted to establish communication from the open end of the valve chamber through the first of the last named ports to one reservoir and from the other reservoir through the second of the last named ports to the first named groove and thence through the third of the last named ports to the milk receiving chamber, and alternately therewith establishing communication from the second groove through the second of the last named ports to the second reservoir and from the first reservoir through the first of the last named ports to the first groove and thence through the third of the last named ports to the milk receiving chamber, a pipe, means to create pneumatic pulsations therein, said pipe constantly communicating with the other of said compartments and with the pulsation chamber and connecting with the milk receiving chamber to create suction therein.

In testimony of which invention, I have hereunto set my hand, at Poughkeepsie, N. Y., on this 30th day of Jany, 1915.

MEREDITH LEITCH.

Witnesses:
CHARLES L. POWELL,
EDWARD F. WEIMAR.